United States Patent [19]
Matheson et al.

[11] Patent Number: 5,644,135
[45] Date of Patent: Jul. 1, 1997

[54] ULTRAVIOLET CURING CHAMBER WITH IMPROVED SEALING DEVICE AND TOOL

[76] Inventors: Derek S. Matheson, 3505 Porter St., N.W., Washington, D.C. 20016; Kevin W. Silbert, 3449 Lindenwood Dr., Laurel, Md. 20724; Christian C. Curtin, 20118 Torrey Pond Pl., Gaithersburg, Md. 20879

[21] Appl. No.: 603,293

[22] Filed: Feb. 20, 1996

[51] Int. Cl.$^6$ .................................................. G01N 21/00
[52] U.S. Cl. ....................... 250/454.11; 250/455.11; 250/492.1; 250/504 R
[58] Field of Search .................... 250/453.11, 454.11, 250/455.11, 492.1, 504 R

[56] References Cited

U.S. PATENT DOCUMENTS

| | | |
|---|---|---|
| 3,654,459 | 4/1972 | Coleman ..................... 250/453.11 |
| 3,790,801 | 2/1974 | Coleman . |
| 4,120,066 | 10/1978 | Leroux ........................... 14/16.5 |
| 4,143,468 | 3/1979 | Novotny et al. .................. 250/398 |
| 4,654,226 | 3/1987 | Jackson et al. . |
| 4,694,180 | 9/1987 | Salisbury et al. .............. 250/455.11 |
| 4,697,203 | 9/1987 | Sakai et al. . |
| 4,752,350 | 6/1988 | Schuster . |
| 4,989,343 | 2/1991 | Ericsson ......................... 250/504 R |
| 5,106,288 | 4/1992 | Hughes . |
| 5,364,333 | 11/1994 | Gulliver et al. . |

*Primary Examiner*—Bruce Anderson
*Attorney, Agent, or Firm*—Shlesinger, Arkwright & Garvey LLP

[57] ABSTRACT

An ultraviolet curing chamber having a window comprised of multiple plates of quartz which are connected with a sealing device. The sealing device is comprised of a ribbon of high compliance material having a central member and cross members. The cross members are spread apart before application of the device to the quartz plates, and after application, the central member lies between the edges of the plates and the cross members, which have returned to a position closer to their original position before having been spread apart and are biased against the top and bottom surfaces of the plates, creating a tight seal.

5 Claims, 2 Drawing Sheets

ULTRAVIOLET CURING CHAMBER WITH IMPROVED SEALING DEVICE AND TOOL

The present invention is directed to an ultraviolet curing chamber having a multi-pane window bearing an improved sealing device for sealing the multiple panes, to a tool for applying the sealing device, and to a method of using the tool.

It is well known to apply ultraviolet curable coating to various types of objects and to expose same to ultraviolet radiation to produce a cured coating with desirable properties. For some curing chemistries, the presence of oxygen tends to inhibit the curing process, and so for such chemistries the amount of oxygen must be controlled. A common way of accomplishing this is to provide a curing chamber in which a flow of nitrogen is used to displace the oxygen so that an inert atmosphere is provided, e.g., see U.S. Pat. No. 3,790,801.

The curing chamber is typically provided with a window through which is irradiated ultraviolet light. The window is typically made of quartz, since the transparency of quartz to ultraviolet radiation is high.

In the prior art, the window was frequently made of single, large sheets of quartz which were formed by heat fusing multiple small panes. The fused area has a crystalline appearance which must be reduced by grinding, an expensive process. The cost per square inch is high, and breakage results in total loss.

Another known arrangement uses additional strips of glass which are clamped over the gap between adjacent panes. This requires precise alignment of the frame parts and subsequent careful assembly, resulting in high cost. The design is also inefficient, as the many small leaks result in large quantities of nitrogen purge gas being used.

Still another expedient used in the prior art is to slit tubes of quartz of the required length and to place in a high temperature oven. The slit tube softens under extreme heat and unfolds to form a flat sheet. The disadvantages of this approach are that the oven is very expensive and if the glass breaks during usage, the cost of replacement is very high.

It is thus an object of the present invention to provide a curing chamber having a window which can be conveniently and inexpensively manufactured, and which will be inexpensive to replace.

It is a further object of the invention to provide the capability of providing a variety of different size windows without stocking large number of different size quartz plates, since the window may be built of smaller plates which are sealed together.

It is a further object of the invention to provide a special tool for applying the sealing device.

The above objects are accomplished by providing a sealing device which effectively and tightly seals multiple plates of quartz together.

The sealing device is comprised of a longitudinally extending body having a central member and cross members, wherein the cross members are at an acute angle to the central member before use. The device is made of a high compliance material having a "memory", such as Teflon® (polytetrafluorethylene), and is ultraviolet resistant as well as heat resistant. The cross members are forcibly spread apart or opened before application to the quartz plates. It is then applied to the co-planar quartz plates so that the central member lies between the edges of the plates while the cross members abut the top and bottom surfaces. Because the high compliance material has a memory, the cross members attempt to return to the original position which they were at before being spread apart. The result is that after application, the sealing device has a substantially I shaped cross section, and the cross members are biased flush against the top and bottom surfaces of the plates, thus effecting a tight seal.

A special tool is provided to spread the cross members of the sealing device apart. It is comprised of two projecting members having conically shaped portions at the ends with conical apices facing but spaced from each other. The sealing device is pulled through the space between the conical apices along the longitudinal dimension of the device, and the cross members are spread apart by the conical surfaces.

The above-described sealing device results in an inexpensive window arrangement which is made of multiple panes or plates of quartz. If breakage should occur, only the broken pane need be replaced, which can be quickly and inexpensively accomplished. A variety of specialized window sizes need not be stocked, because a window can be custom sized by being built up of smaller plates of quartz.

The invention will be better understood by referring to the accompanying drawings wherein.

Figure 1:
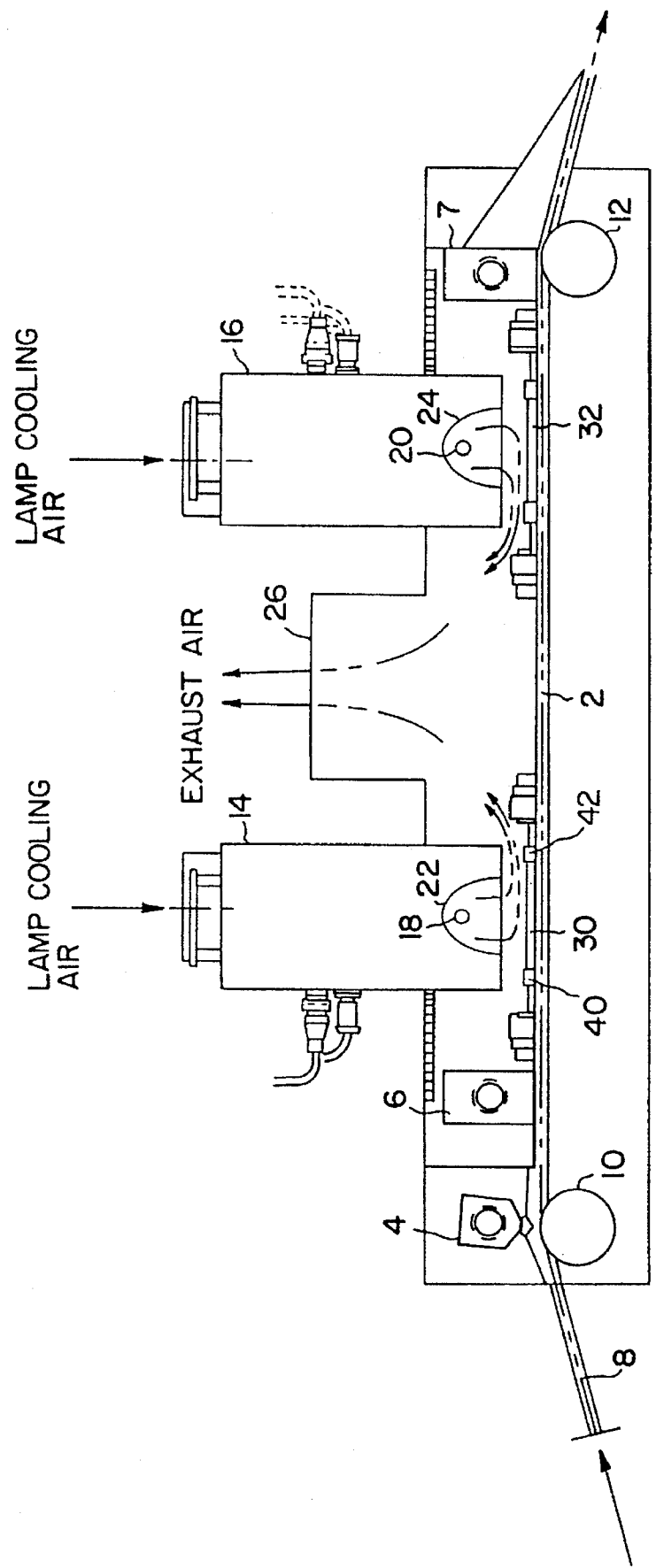
FIG. 1 shows a curing apparatus.

Referring to FIG. 1, an ultraviolet curing apparatus is depicted which has a curing chamber utilizing a controlled atmosphere. As mentioned above, certain curing chemistries require an atmosphere where oxygen is substantially excluded since for such chemistries oxygen inhibits curing. The usual way of excluding oxygen is to displace it with nitrogen.

Referring to FIG. 1, curing chamber 2 is depicted in cross-section. A web 8 having an uncured coating thereon is passed over rollers 10 and 12 which transport the web through the curing chamber. Manifold 4 supplies low pressure nitrogen to remove oxygen from the web surface, while the manifolds 6 and 7 flood the chamber to maintain low oxygen concentrations.

Irradiator units 14 and 16 are provided which direct ultraviolet radiation towards the curing chamber. For example, these may be microwave powered electrodeless lamps manufactured by Fusion Systems Corporation of Rockville, Md., particularly Model I600M. Such lamps include linear bulbs 18 and 20 (which extend into the plane of the paper), and parabolic reflectors 22 and 24. Additionally, cooling air flows into the lamps as shown, out the bottom, and is exhausted through the top of housing 26. A small amount of extra air, or "make up" air, is drawn through larver and exhausted, providing extra cooling of light shield components.

Curing chamber 2 includes ultraviolet transmission windows 30 and 32, so that the ultraviolet radiation may pass therethrough and irradiate the coating on web 8, while the nitrogen is retained in the curing chamber. These windows are made of quartz glass or other suitable ultraviolet transmissive material. In accordance with the invention herein, the windows are made of multiple plates of ultraviolet transmissive material which are connected together with a sealing device.

Figure 2:
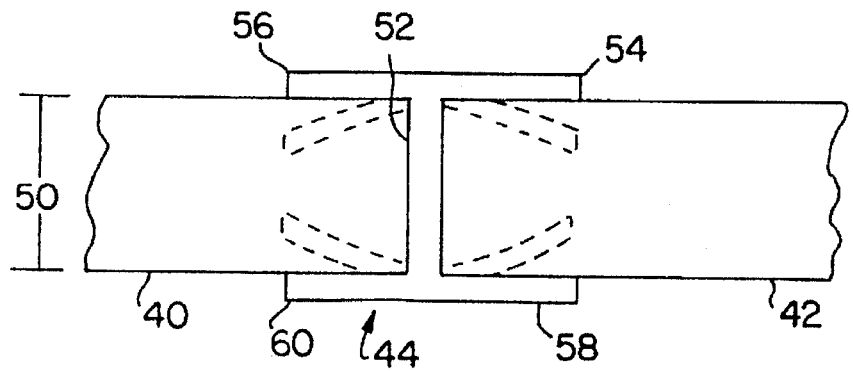
FIG. 2 shows the sealing device.

FIG. 2 illustrates how adjacent plates which comprise the window are connected together with the sealing device disclosed herein. Quartz plates 40 and 42 are sealed with sealing device 44. Sealing device 44 is made of a relatively compliant material, which is ultraviolet resistant and heat resistant, which bends without breaking, and which has a memory and is capable of exerting a strong positive force while attempting to return to its original shape. In the preferred embodiment of the invention, the sealing device is made of PTFE.

In FIG. 2, dimension 50 is the thickness of the quartz, which by way of example may typically be about 0.090". The sealing device 44 has a cross section which is substantially I shaped when connecting the plates. It is comprised of center member 52 and cross members 54, 56, 58, and 60. The original position of the cross members is shown in dotted lines, and it is seen that they are at an acute angle to the center member. Before being applied, the cross members are separated so that they are about perpendicular to the center member or at a slightly obtuse angle thereto. After application to the quartz plates, the cross members attempt to return to their original position with the result that they become biased against the top and bottom surfaces of the quartz, exerting a positive clamping force thereon. This positive clamping force of the relatively compliant polymer on the quartz results in an air-tight seal.

Figure 3:
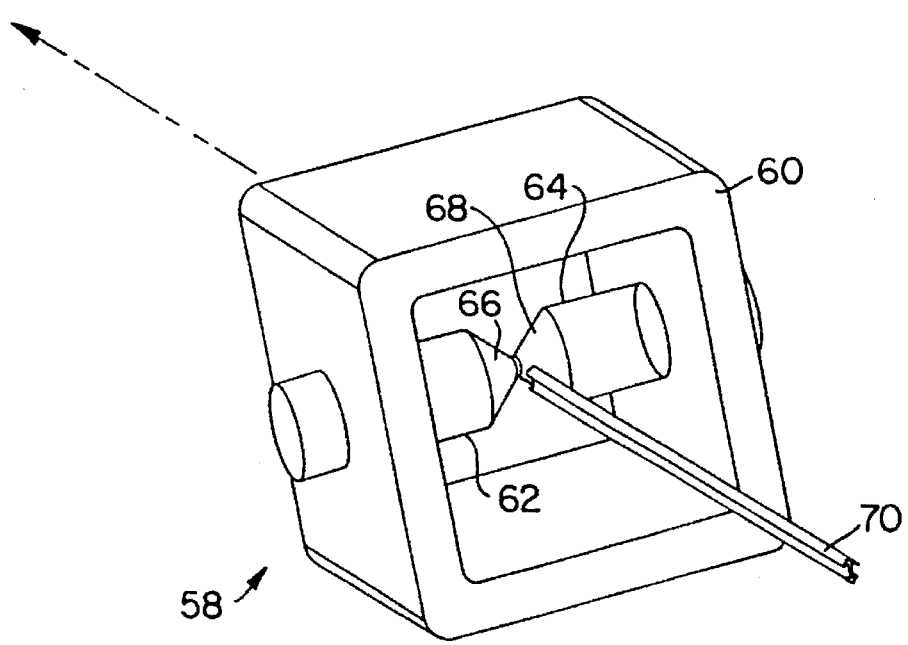
FIG. 3 shows the tool used for applying the sealing device.

FIG. 3 shows the tool 58 which is used to separate the cross members of the sealing device. This tool may be made of metal or other rigid material, and is comprised of frame 60 in which projection members 62 and 64 are fixedly mounted by close-tolerance press fits and are welded thereto. The projection members 62 and 64 are right circular cylinders which have conically tapered ends 66 and 68. There is a small space between the conical apices.

In accordance with a method of the invention, the sealing device 70 is pulled through the space between the conical apices along the longitudinal dimension of the sealing device, with the result that the cross members of the sealing device become separated.

Figure 4:
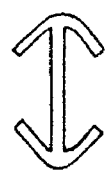
FIG. 4 shows a cross-section of the sealing device before use of the tool of FIG. 3.
Figure 5:
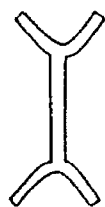
FIG. 5 shows the cross-section after use of the tool.

FIG. 4 shows the shape of the sealing device before being pulled through tool 58, while FIG. 5 shows its shape after being pulled through.

The sealing device should be applied to the quartz plates immediately or shortly after having been pulled through tool 58. The cross members take from 5 minutes to 60 minutes to return to their original position, depending on temperature and external forces.

The plates are mounted in a removable metal pan, which is placed in the apparatus. Referring to FIG. 1, reference numerals 40 and 42 represent the area where the quartz interfaces with the pan, and is clamped, in rubber gasketing, between metal plates.

It should be appreciated that while the invention has been disclosed in connection with an illustrative embodiment, variations will occur to those skilled in the art, and its scope is to be limited only by the claims appended hereto as well as equivalents.

We claim:

1. An ultraviolet curing apparatus, comprising, a curing chamber for accommodating a controlled atmosphere, said curing chamber having a window for admitting ultraviolet light, an irradiator for providing ultraviolet radiation which is directed at said window of said curing chamber, said window being comprised of co-planar plates of ultraviolet-transmissive material which are joined together by a sealing device which is made of a material having a memory which is bendable without breaking, said sealing device having a substantially I shaped cross-section when sealing said plates and being comprised of a center member and cross members, said sealing device being positioned so that the center member is between the edges of the co-planar plates and the cross members abut the flat surfaces of the plates, the cross members having been spread apart prior to application of the device to the plates, and after application because of said memory having attempted to return to their original position with the result that they are biased against the flat surfaces of said plates so as to form a seal between said plates.

2. The curing apparatus of claim 1 wherein said sealing device is made of an ultraviolet resistant material.

3. The curing apparatus of claim 2 wherein said sealing device is made of polytetrafluoroethylene.

4. The curing apparatus of claim 3 wherein said co-planar plates are made of quartz.

5. The curing apparatus of claim 4 wherein said controlled atmosphere substantially excludes oxygen.

* * * * *